(12) United States Patent
Hori

(10) Patent No.: US 9,472,810 B2
(45) Date of Patent: Oct. 18, 2016

(54) PRODUCTION METHOD OF POROUS LAYER MATERIAL AND PRODUCTION METHOD OF MEMBRANE ELECTRODE AND GAS DIFFUSION LAYER ASSEMBLY INCLUDING POROUS LAYER MATERIAL

(71) Applicant: TOYOTA JIDOSHA KABUSHIKI KAISHA, Toyota-shi, Aichi-ken (JP)

(72) Inventor: Yoshihiro Hori, Nisshin (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 14/437,520

(22) PCT Filed: Sep. 30, 2013

(86) PCT No.: PCT/JP2013/005799
§ 371 (c)(1),
(2) Date: Apr. 22, 2015

(87) PCT Pub. No.: WO2014/076863
PCT Pub. Date: May 22, 2014

(65) Prior Publication Data
US 2015/0303486 A1    Oct. 22, 2015

(30) Foreign Application Priority Data

Nov. 19, 2012 (JP) .................................. 2012-253172

(51) Int. Cl.
*H01M 4/88* (2006.01)
*H01M 8/10* (2016.01)
(Continued)

(52) U.S. Cl.
CPC ......... *H01M 4/8807* (2013.01); *H01M 4/8605* (2013.01); *H01M 4/88* (2013.01); *H01M 4/881* (2013.01); *H01M 4/8864* (2013.01); *H01M 8/0234* (2013.01); *H01M 8/0239* (2013.01); *H01M 8/0243* (2013.01); *H01M 8/0245* (2013.01); *H01M 8/1002* (2013.01); *H01M 8/1004* (2013.01); *H01M 2008/1095* (2013.01); *H01M 2250/20* (2013.01); *Y02E 60/521* (2013.01); *Y02P 70/56* (2015.11); *Y02T 90/32* (2013.01)

(58) Field of Classification Search
CPC ........... H01M 4/8807; H01M 4/8605; H01M 4/881; H01M 4/8864
See application file for complete search history.

(56) References Cited

U.S. PATENT DOCUMENTS

| 6,428,722 B1 * | 8/2002 | Furuya ................. C25B 11/035 252/510 |
| 2006/0204833 A1 | 9/2006 | Nomi et al. |
| 2009/0029234 A1 | 1/2009 | Okumura et al. |

(Continued)

FOREIGN PATENT DOCUMENTS

| CN | 101355167 A | 1/2009 |
| CN | 102422469 A | 4/2012 |
| JP | 61-276987 | 12/1986 |
| JP | 2001-189155 | 7/2001 |

(Continued)

*Primary Examiner* — Nicholas P D'Aniello
(74) *Attorney, Agent, or Firm* — Finnegan, Henderson, Farabow, Garrett & Dunner, LLP

(57) ABSTRACT

A production method of a porous layer material for forming a porous layer includes the steps of obtaining particles that contain carbon and a water-repellent resin by spray drying a mixed solution that includes the carbon and the water-repellent resin, producing a paste that includes the particles, and extruding or rolling the paste to obtain the porous layer material in a sheet-like form.

3 Claims, 4 Drawing Sheets

(51) Int. Cl.
*H01M 4/86* (2006.01)
*H01M 8/02* (2016.01)

(56) References Cited

U.S. PATENT DOCUMENTS

2009/0104508 A1* 4/2009 Lee .................... H01M 4/8668
429/535
2012/0034548 A1 2/2012 Okuyama et al.

FOREIGN PATENT DOCUMENTS

| | | |
|---|---|---|
| JP | 2004-55193 | 2/2004 |
| JP | 2006-252948 | 9/2006 |
| JP | 2006-339018 | 12/2006 |
| JP | 2007-115574 | 5/2007 |
| JP | 2008-243767 | 10/2008 |
| JP | 2011-76848 | 4/2011 |
| WO | WO 97/13287 | 4/1997 |

* cited by examiner

[S125]

[S130], [S135], [S140]

PRODUCTION METHOD OF POROUS LAYER MATERIAL AND PRODUCTION METHOD OF MEMBRANE ELECTRODE AND GAS DIFFUSION LAYER ASSEMBLY INCLUDING POROUS LAYER MATERIAL

CROSS-REFERENCE TO RELATED APPLICATIONS

This application is a national phase application of International Application No. PCT/JP2013/005799, filed Sep. 30, 2013, and claims the priority of Japanese Application No. 2012-253172, filed Nov. 19, 2012, the content of both of which is incorporated herein by reference.

TECHNICAL FIELD

The present invention relates to a porous layer material used for a fuel cell and a membrane electrode and gas diffusion layer assembly including the porous layer material.

BACKGROUND ART

A fuel cell may be configured to have a layer where a large number of small pores are formed (hereinafter referred to as "porous layer") placed between a catalyst layer and a gas diffusion layer. For example, an available method of forming the porous layer mixes particles including carbon black powder and polytetrafluoroethylene (PTFE) with a dispersed solution of PTFE to form a slurry and applies the slurry on a gas diffusion layer, as described in Patent Literature 1. In another example, as described in Patent Literature 2, another available method first mixes carbon particles with fine powder of PTFE using a blender and additionally adds a processing aid to obtain a mixture. The method subsequently extrudes and rolls the mixture to obtain a film and places the film between a catalyst layer and a gas diffusion layer. As described in Patent Literature 2, another available method adds a precipitating agent to a mixed solution of carbon particles and a dispersed solution of PTFE to coprecipitate carbon and PTFE, subsequently filtrates and dries the coprecipitate and subsequently adds a processing aid to obtain a mixture. The method subsequently extrudes and rolls the mixture to obtain a film and places the film between a catalyst layer and a gas diffusion layer.

CITATION LIST

Patent Literature

PTL1: JP 2008-243767A
PTL2: JP 2006-252948A

SUMMARY

Technical Problem

The method described in Patent Literature 1, however, causes the slurry to be penetrated in the gas diffusion layer in the course of application of the slurry. In application of the porous layer obtained by this method for a fuel cell, water may be accumulated in an area which the slurry is penetrated in. This may cause deterioration of the water drainage performance of the fuel cell. Penetration of the slurry in the gas diffusion layer may also may reduce the gas diffusion area and cause deterioration of the gas dispersibility.

In the method of mixing carbon particles with PTFE fine power using a blender described in Patent Literature 2, the two different particles (different solid substances) are mixed with each other and the average particle diameter of PTFE particles included in the fine powder is significantly larger than the average particle diameter of the carbon particles, so that there is a difficulty in uniformly dispersing the carbon particles and the PTFE particles. The uneven dispersion the carbon particles and the PTFE particles is likely to cause unevenness in power generation in the fuel cell and deterioration of the power generation performance.

In the method of adding the precipitating agent to the mixed solution of the carbon particles and the dispersed solution of PTFE to coprecipitate carbon and PTFE described in Patent Literature 2, the homogeneity of PTFE in the dispersed solution of PTFE is deteriorated with elapse of time. An upper layer part and a lower layer part of the coprecipitate may accordingly have different compositions. It is thus unlikely to disperse carbon and PTFE uniformly in the coprecipitate. Additionally, this method requires a long time for precipitation and drying and accordingly has the low productivity. Other needs with respect to the conventional method of forming the porous layer include reducing the cost and facilitating the process.

Solution to Problem

In order to solve at least part of the problems described above, the invention may be implemented by the following aspects.

(1) According to one aspect of the invention, there is provided a production method of a porous layer material for forming a porous layer placed between a gas diffusion layer and a catalyst layer in a fuel cell. The production method comprises the steps of (a) obtaining particles containing carbon and a water-repellent resin by spray drying a mixed solution including the carbon and the water-repellent resin, (b) producing a paste including the particles, and (c) extruding or rolling the paste to obtain the porous layer material in a sheet-like form. The production method of this aspect obtains the porous layer material in the sheet-like form. The porous layer is formed by joining the porous layer material with the gas diffusion layer or the catalyst layer. This suppresses penetration of the porous layer material into the gas diffusion layer and accordingly suppresses deterioration of the water drainage performance and the gas dispersibility in the gas diffusion layer. Additionally, the particles as the base material of the porous layer material are obtained by spray drying the mixed solution including the carbon and the water-repellent resin. This enables the carbon and the water-repellent resin to be substantially uniformly dispersed in the particles. This suppresses uneven distribution of the carbon and the water-repellent resin in the porous layer, thus suppresses the unevenness in water drainage performance in the porous layer. The spray drying technique also enables the particles including the carbon and the water-repellent resin to be produced in a relatively short time period. The sheet-like material is obtained as the porous layer material, so that the step of joining the porous layer material and the step of joining the material for gas diffusion layer may be provided as different steps.

(2) In the production method of the above aspect, the water-repellent resin may comprise polytetrafluoroethylene. The production method of this aspect provides the porous layer with high water repellency.

(3) According to another aspect of the invention, there is provided a production method of a membrane electrode and gas diffusion layer assembly including the porous layer material produced by the production method of the above aspect. The production method of the membrane electrode and gas diffusion layer assembly comprises the steps of (d) joining the porous layer material with a material for catalyst layer under application of a first force, and (e) joining a material for gas diffusion layer with the porous layer material joined with the material for catalyst layer under application of a second force that is smaller than the first force. The production method of this aspect causes the second force applied for joining the porous layer material with the material for gas diffusion layer to be smaller than the first force applied for joining the porous layer material with the material for catalyst layer. This suppresses the material for gas diffusion layer from being stuck through the porous layer, the catalyst layers of both the electrodes and the electrolyte membrane. This accordingly suppresses a short circuit between the electrodes.

(4) The production method of the above aspect may further comprises the steps of (f) providing an electrolyte membrane sheet that includes a carrier film and an electrolyte membrane placed on the carrier film, (g) placing the material for catalyst layer on the electrolyte membrane of the electrolyte membrane sheet, and (h) removing the carrier film from the electrolyte membrane sheet, wherein performing the step (d) after the step (g) to form the porous layer of one electrode, subsequently performing the step (h) and then performing the step (d) to form the porous layer of the other electrode. The production method of this aspect joins the porous layer material on one electrode side, before removing the carrier film from the electrolyte membrane sheet. After removal of the carrier film, the porous layer material serves instead of the carrier film to protect the electrolyte membrane and suppress deformation of the electrolyte membrane.

The invention may be implemented by any of various aspects: for example, a fuel cell including the porous layer material and the membrane electrode and gas diffusion layer assembly, a production method of the fuel cell, and a vehicle equipped with the fuel cell.

DESCRIPTION OF EMBODIMENTS

A. Embodiment

Figure 1:
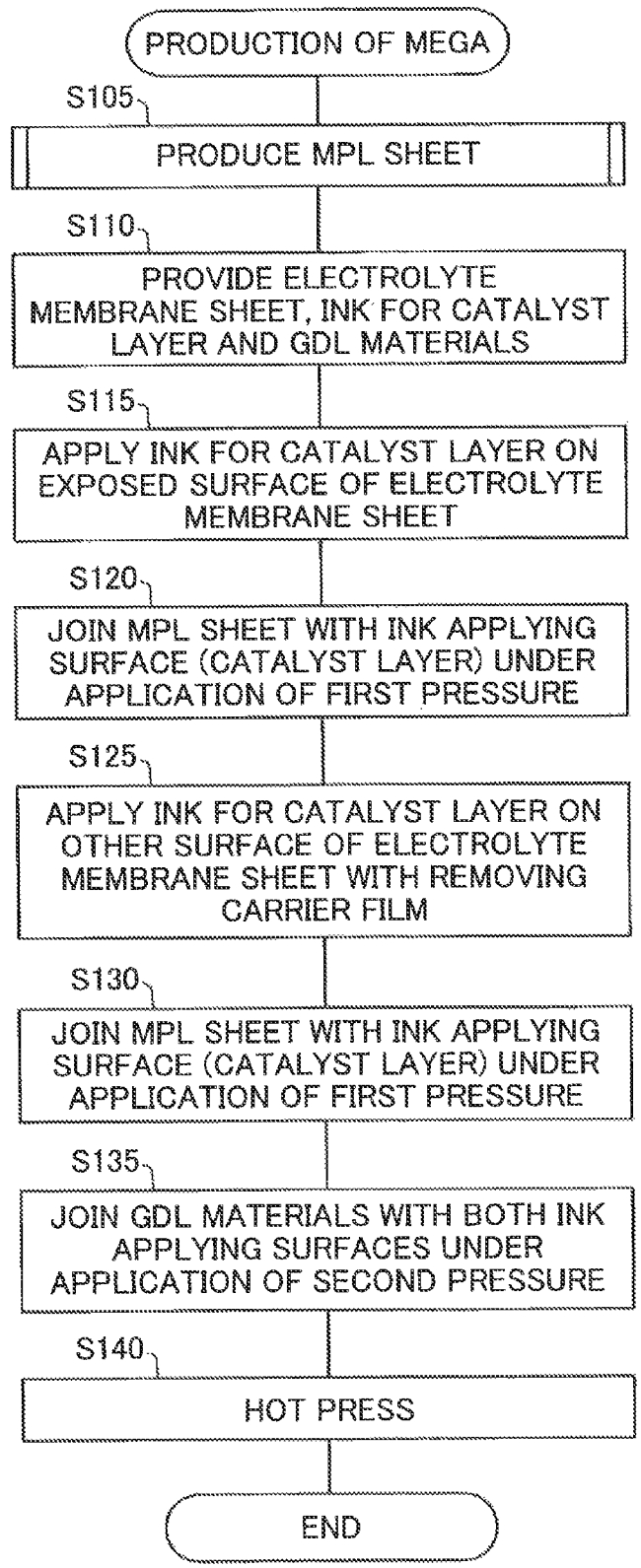
FIG. 1 is a flowchart showing a procedure of production method of a membrane electrode and gas diffusion layer assembly used for a fuel cell.

FIG. 1 is a flowchart showing a procedure of production method of a membrane electrode and gas diffusion layer assembly (hereinafter referred to as "MEGA") used for a fuel cell. As shown in FIG. 1, MPL (microporous layer) sheets are produced first (step S105). The MPL sheet is placed between a catalyst layer and a gas diffusion layer to form an MPL layer in the fuel cell.

Figure 2:
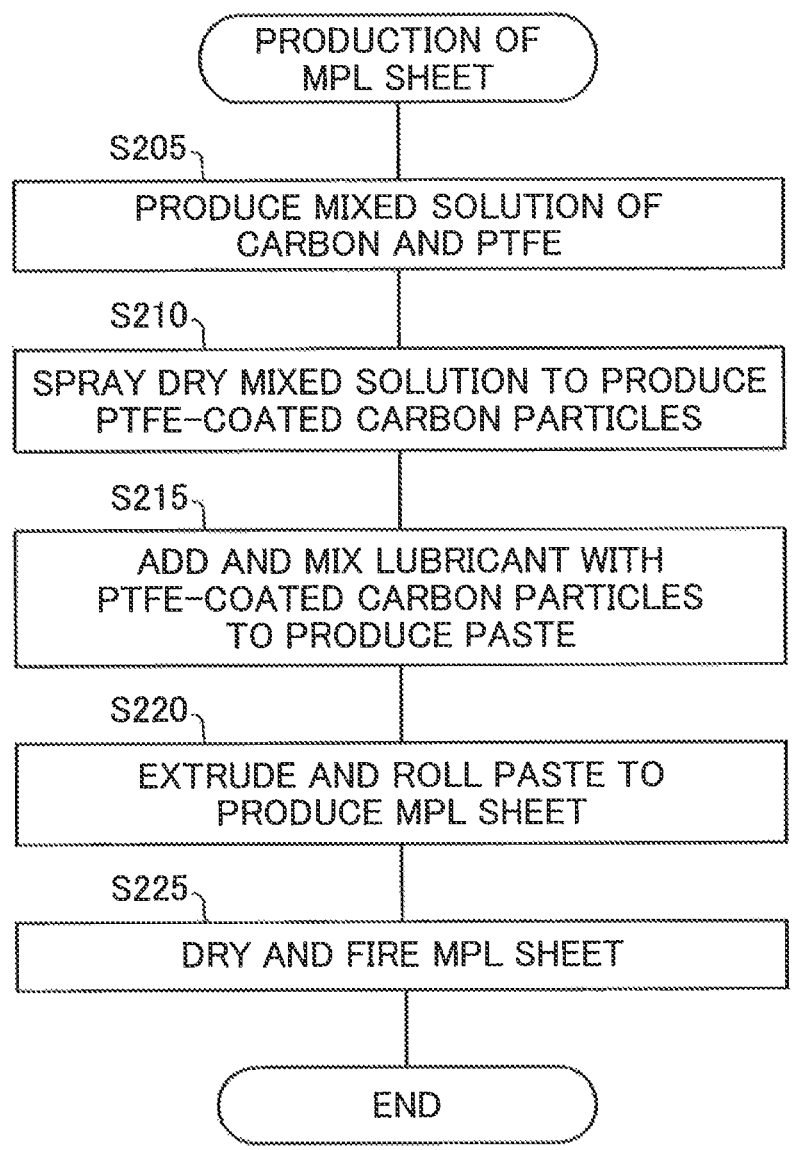
FIG. 2 is a flowchart showing a procedure of producing MPL sheets at step S105.

FIG. 2 is a flowchart showing a procedure of producing the MPL sheets at step S105. The procedure first produces a mixed solution of carbon as an electrically conductive material and polytetrafluoroethylene (PTFE) as a water-repellent resin (step S205). More specifically, the procedure adds a surfactant to deionized water with stirring and subsequently adds carbon and further disperses the solution mixture. The procedure then adds a dispersed solution of PTFE to this solution mixture with stirring, so as to produce the mixed solution of carbon and PTFE. The surfactant is preferably a nonionic surfactant which is unlikely to be affected by pH. The carbon may be, for example, acetylene black, furnace black, thermal black or graphite. Using commercially available acetylene black, Vulcan XC or Ketjen black has the advantages of providing the high electrical conductivity and facilitating formation of the high-order structure of PTFE when being mixed with PTFE. Any other resin having water repellency, such as PFA (polytetrafluoroethylene or tetrafluoroethylene resin) or ETFE (ethylene/tetrafluoroethylene copolymer) may be used instead of PTFE described above.

The procedure spray dries the mixed solution of carbon and PTFE obtained at step S205 to produce PTFE-coated carbon particles (step S210). The procedure adds and mixes a lubricant with the PTFE-coated carbon particles produced at step S210 to produce a paste including the PTFE-coated carbon particles (step S215). The mixed solution of carbon and PTFE is spray dried at step S210, since production of the paste using the particles obtained by spray drying ensures carbon and PTFE to be uniformly dispersed in the paste.

The procedure then extrudes and rolls the paste produced at step S215 to produce the MPL sheet (step S220). For example, the MPL sheet may be produced by extruding the paste produced at step S215 with an extruder to form beads and rolling the beads with a heat rolling mill.

The procedure dries the MPL sheet produced at step S220 to remove the lubricant and subsequently fires the dried MPL sheet to remove the surfactant, so as to complete the MPL sheet (step S225). The completed MPL sheet has a large number of small pores. In application of this MPL sheet to a fuel cell, it is expected that water produced in the course of power generation is discharged to a gas diffusion layer by taking advantage of the capillarity of the small pores. The above procedure may be modified to omit the drying process but perform only the firing process at step S225 in order to remove both the lubricant and the surfactant in the firing process.

Referring back to FIG. 1, after completion of the MPL sheets, an electrolyte membrane sheet, an ink for catalyst layer and gas diffusion layer (hereinafter called "GDL") materials are provided (step S110). According to this embodiment, the electrolyte membrane sheet is comprised of a carrier film and a sheet-like electrolyte membrane bonded to the carrier film. The carrier film is a sheet used to protect the electrolyte membrane and may be a film of a synthetic resin such as polyethylene terephthalate (PET) or ETFE. The electrolyte membrane may be a fluororesin-based ion exchange membrane having a sulfonate group, for example, Nafion (registered trademark) manufactured by duPont, Aciplex (registered trademark) manufactured by Asahi Kasei Corp. or Flemion (registered trademark) manufactured by Asahi Glass Co., Ltd. The ink for catalyst layer may be, for example, an aqueous solution containing a catalyst carrier such as platinum-supported carbon and an electrolytic solution. The GDL material may be, for example, a carbon porous material such as carbon paper or carbon cloth, or a metal porous material such as metal mesh or metal form. The carbon paper may be made of, for example, polyacrylonitrile (PAN)-based carbon fibers, pitch-based carbon fibers, cellulose-based carbon fibers or polynosic-based carbon fibers. Among these carbon fibers, it is preferable to use the PAN-based carbon fibers, because of little impurity.

The ink for catalyst layer provided at step S110 is applied on an exposed surface (surface of the electrolyte membrane on the side not bonded to the carrier sheet) of the electrolyte membrane sheet provided at step S110 (step S115). This process forms a catalyst layer of one electrode out of catalyst layers of two electrodes.

The electrolyte membrane sheet with the catalyst layer of one electrode formed thereon is joined with the MPL sheet produced at step S105 under application of a first pressure (step S120). At step S120, the MPL sheet is joined with the surface of the electrolyte membrane sheet with the catalyst layer formed thereon by applying the ink for catalyst layer. This process forms an MPL layer of one electrode. According to this embodiment, the term "MPL sheet" denotes a material for forming the MPL layer, and the term "MPL layer" denotes a layer formed by joining the MPL sheet with another layer or a material for forming another layer.

Figure 3A:
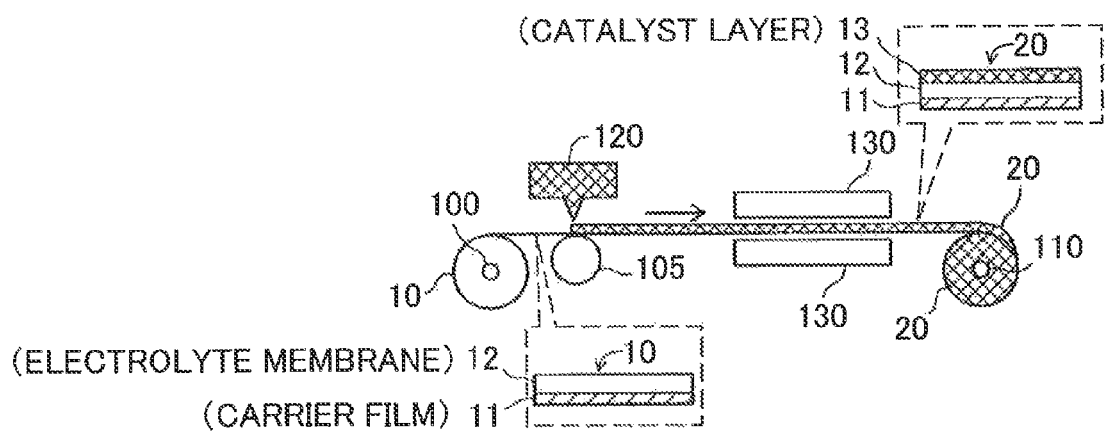
FIGS. 3A and 3B are diagrams schematically illustrating the processes of steps S115 and S120 in FIG. 1.
Figure 3B:
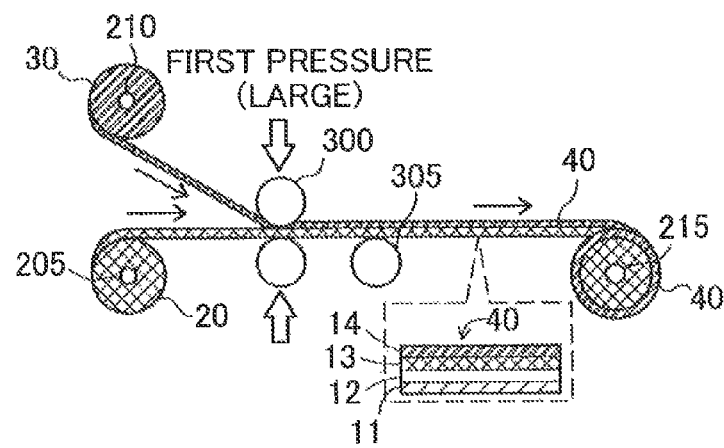

FIGS. 3A and 3B are diagrams schematically illustrating the processes of steps S115 and S120 in FIG. 1. FIG. 3A shows the process of step S115, and FIG. 3B shows the process of step S120.

According to this embodiment, a die coater is used at step S115. As shown in FIG. 3A, the die coater includes a feed roller 100, a conveyance roller 105, a die head 120, a windup roller 110 and a dryer 130. The feed roller 100 feeds an electrolyte membrane sheet 10. As shown in FIG. 3A, the electrolyte membrane sheet 10 is configured to have an electrolyte membrane 12 placed on a carrier film 11. The conveyance roller 105 conveys the electrolyte membrane sheet 10 fed from the feed roller 100. An ink for catalyst layer is supplied to the die head 120. The die head 120 applies the supplied ink for catalyst layer on the conveyed electrolyte membrane sheet 10. The dryer 130 is located on the conveyance path of the electrolyte membrane sheet 10 and dries the electrolyte membrane sheet 10 with the ink for catalyst layer applied thereon. The windup roller 110 winds up an electrolyte membrane sheet 20 with a catalyst layer 13 formed from the ink for catalyst layer.

As shown in FIG. 3B, at step S120, the electrolyte membrane sheet 20 is joined with an MPL sheet 30 using a feed roller 205, a feed roller 210, a pressure roller 300, a conveyance roller 305 and a windup roller 215. The feed roller 205 feeds the electrolyte membrane sheet 20. The feed roller 210 feeds the MPL sheet 30 produced at step S105. The pressure roller 300 joins the electrolyte membrane sheet 20 with the MPL sheet 30 under application of a first pressure. As shown in FIG. 3B, joining the electrolyte membrane 20 with the MPL sheet 30 using the pressure roller 300 gives an electrolyte membrane sheet 40 comprised of the carrier film 11, the electrolyte membrane 12, the catalyst layer 13 and an MPL layer 14. The conveyance roller 305 conveys the electrolyte membrane sheet 40. The windup roller 215 winds up the electrolyte membrane sheet 40.

Referring back to FIG. 1, after the process of step S120, the carrier sheet is removed from the electrolyte membrane sheet, and the ink for catalyst layer is applied on the other surface of the electrolyte membrane sheet opposite to the surface with the catalyst layer and the MPL layer formed thereon (step S125). This process forms a catalyst layer of the other electrode opposite to the electrode of the catalyst layer formed at step S115.

The electrolyte membrane sheet with the catalyst layer formed at step S125 is joined with the MPL sheet produced at step S105 under application of a first pressure (step S130). At step S130, the MPL sheet is joined with the surface of the electrolyte membrane sheet with the catalyst layer formed thereon at step S125. This process forms an MPL layer of the other electrode opposite to the electrode of the MPL layer formed at step S120.

The electrolyte membrane sheet with the catalyst layers of both the electrodes and the MPL layers of both the electrodes formed thereon is joined with the GDL materials under application of a second pressure (step S135). At step S135, the GDL materials are joined with both the surfaces (two surfaces with the MPL layers respectively formed thereon) of the electrolyte membrane sheet. This process forms GDL layers of both the electrodes.

The MEGA is completed by hot pressing the electrolyte membrane with the catalyst layers of both the electrode, the MPL layers of both the electrodes and the GDL layers of both the electrodes formed thereon (assembly) (step S140).

Figure 4A:
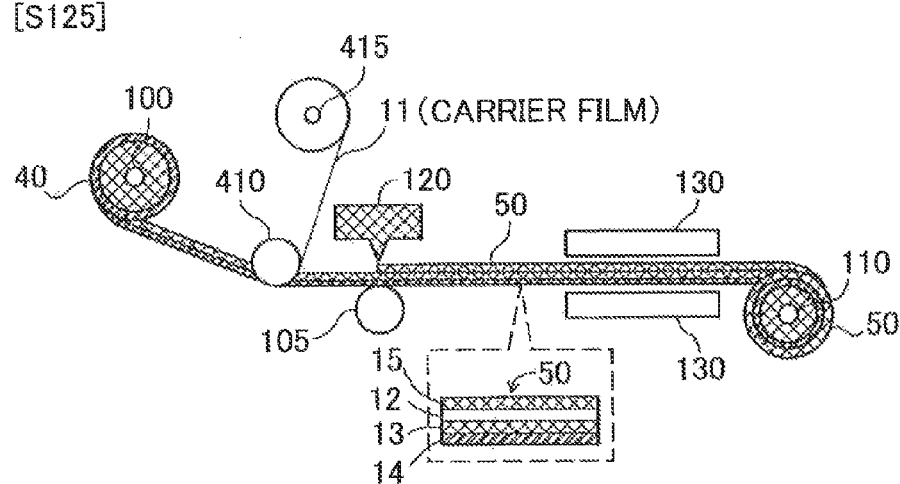
FIGS. 4A and 4B is diagrams schematically illustrating the processes of steps S125, S130, S135 and S140.
Figure 4B:
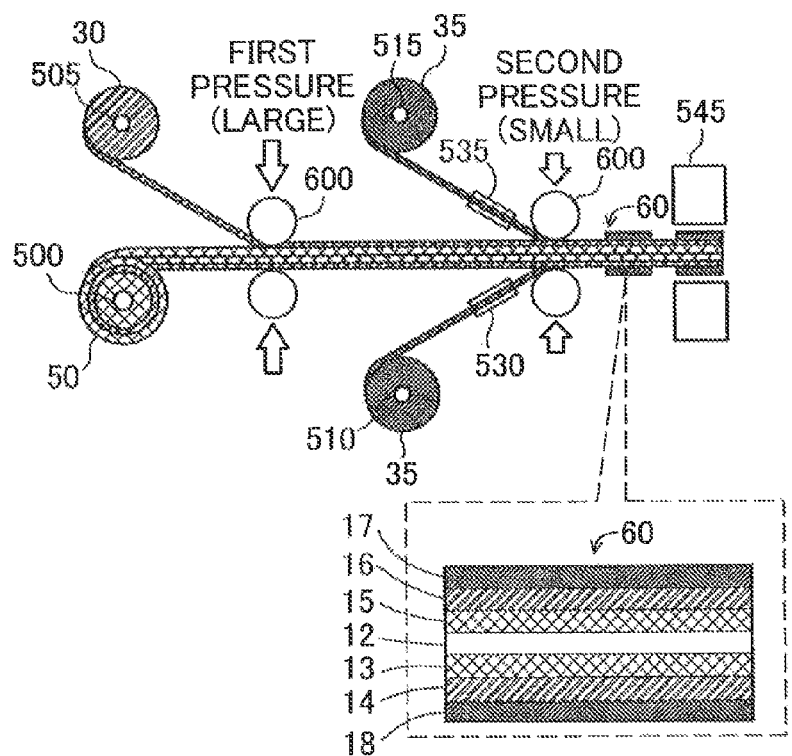

FIGS. 4A and 4B are diagrams schematically illustrating the processes of steps S125, S130, S135 and S140 in FIG. 1. FIG. 4A shows the process of step S125, and FIG. 4B shows the processes of steps S130, S135 and S140.

As shown in FIG. 4A, a die coater similar to the die coater shown in FIG. 3A is used at step S125. The die coater used at step S125 differs from the die coater shown in FIG. 3A by addition of a removal roller 410 and a windup roller 415.

The feed roller 100 feeds the electrolyte membrane sheet 40 produced at step S120. The removal roller 410 removes the carrier film 11 from the electrolyte membrane sheet 40 and conveys the removed carrier film 11. The windup roller 415 winds up the carrier film 11 removed from the electrolyte membrane sheet 40. The die head 120 applies the ink for catalyst layer on a surface of the electrolyte membrane 12 exposed by removal of the carrier film 11. The conveyance roller 105 conveys an electrolyte membrane sheet 50 with the in, for catalyst layer applied thereon by the die head 120. As shown in FIG. 4A, the electrolyte membrane sheet 50 has a layered structure of the MPL layer 14, the catalyst layer 13, the electrolyte membrane 12 and a catalyst layer 15. The catalyst layer 15 is formed at step S125. The dryer 130 dries the electrolyte membrane sheet 50. The windup roller 110 winds up the dried electrolyte membrane sheet 50.

As shown in FIG. 4B, at step S130, the electrolyte membrane sheet 50 is joined with the MPL sheet 30 using a feed roller 500, a feed roller 505 and a first pressure roller 600. The roller 500 feeds the electrolyte membrane sheet 50 with the catalyst layer formed thereon at step S125. The feed roller 505 feeds the MPL sheet 30 produced at step S105. The first pressure roller 600 joins the electrolyte membrane sheet 50 with the MPL sheet 30 under application of a first pressure. This process forms an MPL layer 16 on the catalyst layer 15.

As shown in FIG. 4B, at step S135, the GDL materials are joined with the catalyst layers using a feed roller 510, a feed roller 515, a cutting machine 530, a cutting machine 535 and a second pressure roller 610. The two feed rollers 510 and 515 respectively feed the GDL materials provided at step S110. The cutting machine 530 cuts the GDL material fed from the feed roller 510 to a predetermined size. Similarly the cutting machine 535 cuts the GDL material fed from the feed roller 515 to a predetermined size. The GDL material cut by the cutting machine 530 is placed on the MPL layer 14 of one electrode. The GDL material cut by the cutting machine 535 is, on the other hand, placed on the MPL layer 16 of the other electrode. The second pressure roller 610 joins the electrolyte membrane with the MPL layer formed thereon at step S130 with the GDL materials under application of a second pressure. This process forms GDL layers on the respective catalyst layers of both the electrodes.

The second pressure is smaller than the first pressure applied at step S120 and at step S130. This suppresses the occurrence of a short circuit by part of the GDL material (for example, carbon fibers of the carbon paper) stuck through the adjacent catalyst layer, the electrolyte membrane 12 and the catalyst layer of the other electrode in the course of joining the GDL materials.

As shown in FIG. 4B, an assembly 60 obtained has a layered structure of the electrolyte membrane 12, the two catalyst layers 13 and 15 formed on the electrolyte membrane 12, the MPL layer 14 formed on the catalyst layer 13, the MPL layer 16 formed on the catalyst layer 15, a GDL layer 18 formed on the MPL layer 14 and a GDL layer 17 formed on the MPL layer 16.

As shown in FIG. 4B, at step S140, the assembly 60 is hot pressed using a hot press machine 545. A fuel cell is completed by placing the completed MEGA between two separators.

The production method of MEGA according to the embodiment described above produces the MPL sheets and joins the MPL sheets with the electrolyte membrane sheet with the catalyst layers formed thereon to form the MPL layers. This suppresses penetration of the component material of the MPL layer into the gas diffusion layer. This accordingly suppresses deterioration of water drainage performance and deterioration of the gas dispersibility caused by penetration of the base material of the MPL layer into the gas diffusion layer.

Additionally, the MPL sheets are used to form the MPL layers. This enables the process of joining the MPL sheets with the electrolyte membrane sheet with the catalyst layers formed thereon (steps S120 and S130) to be separated from the process of joining the GDL materials with the electrolyte membrane sheet with the MPL layers formed thereon (step S135). This enables the pressure applied for joining the electrolyte membrane sheet with the MPL sheet (first pressure) to be different from the pressure applied for joining the electrolyte membrane sheet with the GDL materials (second pressure). Setting a relatively large pressure to the pressure applied for joining the electrolyte membrane sheet with the MPL sheet (first pressure) causes the MPL layer and the catalyst layer to be closely joined with each other. This enhances the drainage performance of water in the catalyst layer. Setting a relatively small pressure to the pressure applied for joining the electrolyte membrane sheet with the GDL materials (second pressure) suppresses the GDL materials from being stuck through the electrolyte membrane and the catalyst layers of both the electrodes. This accordingly suppresses a short circuit of both the electrodes.

The mixture (particles) as the base material of the MPL sheet is produced by spray drying the mixed solution of carbon and PTFE. This enables carbon and PTFE to be uniformly dispersed in the mixture. This accordingly suppresses uneven distribution of carbon and PTFE in the MPL layer. The spray drying technique also enables the mixture of carbon and PTFE to be obtained in a relatively short time period. This improves the production efficiency of the MEGA.

The MPL sheet is joined with the catalyst layer of one electrode at step S120. The joined MPL sheet suppresses deformation of the electrolyte membrane after removal of the carrier film at step S125.

The MPL sheet described above corresponds to the porous layer material of the claims. The MPL layer and PTFE respectively correspond to the porous layer and the water-repellent resin of the claims.

B. Example

B1. Production of MPL Sheet

At step S205, after addition of Triton X as the surfactant to deionized water, the aqueous solution was stirred with a stirrer for 10 minutes. The rotation speed of the stirrer was set to a specified rotation speed producing no bubbles. The amount of Triton X added was determined such that the content of Triton X was approximately 10 wt % in the aqueous solution. Acetylene black (trade name: HS-100 manufactured by DENKI KAGAKU KOGYO KABUSHIKI KAISHA) was subsequently added as the carbon to the aqueous solution. The aqueous solution after addition of acetylene black was stirred with a homo mixer, so that acetylene black was dispersed. A homogeneous mixed solution (carbon black slurry) with little clumping was obtained by setting the stirring time to 1 to 3 hours. Subsequently D-111 (manufactured by DAIKIN INDUSTRIES, LTD.) was added as a fluid dispersion of PTFE to the mixed solution obtained. The amount of the fluid dispersion of PTFE added was determined such that the content of PTFE (solid substance) was approximately 40 wt % in the mixed solution. The mixed solution after addition of the fluid dispersion of PTFE was subsequently stirred for 10 minutes with a planetary mixer.

At step S210, PTFE-coated carbon particles were obtained by spray drying the mixed solution obtained at step S205 with a spray drying machine (manufactured by Fujisaki Electric Co., Ltd.) The conditions of spray drying were the hot air temperature set to 150° C. and the dropping rate of the mixed solution set to 50 cc/min. The particle diameter of the PTFE-coated carbon particles obtained was 3 to 7 µm.

At step S215, a mixture (paste) was produced by adding and mixing ISOPAR M (manufactured by Exxon Mobile Corporation) as the lubricant with the PTFE-coated carbon particles for 1 hour with a ball mill. The produced paste was then left at room temperature (about 25° C.) for 8 hours. The amount of ISOPAR M added (concentration) was determined such that the content was approximately 30 wt % in the mixture.

At step S220, the paste produced at step S215 was extruded to beads using a ram extruder (manufactured by Tabata Industrial Machinery Co., Ltd.) The conditions of extrusion were the bead diameter set to 20 mm, the cylinder temperature set to 50° C. and the extrusion rate set to 10 mm/min. The cylinder temperature may be set to any temperature in the range from room temperature (about 25° C.) to 70° C. The extrusion rate may be set to any rate in the range from 1 mm/min to 20 mm/min. The beads were then rolled to 0.05 mm using a heat rolling machine. The rolling conditions were the roll temperature set to 70° C. and the feed speed set to 0.5 m/min. Rolling was performed in two stages. More specifically, the beads were rolled to a sheet of 0.2 mm in thickness at the first stage, and the sheet of 0.2 mm in thickness was further rolled to a sheet of 0.05 mm in thickness at the second stage.

The drying conditions at step S225 were the drying temperature set to 150° C. and the drying time set to 1 hour. The firing conditions at step S225 were the firing temperature set to 300° C. and the firing time set to 10 minutes.

B2. Production of MEGA

The carbon paper made of the PAN-based carbon fibers was used as the GDL material. The first pressure at step S120 and step S130 was set to 3 MPa, and the second pressure at step S135 was set to 1 MPa.

B3. First Comparative Example

MEGA of a first comparative example was produced. The production method of MEGA of the first comparative example produced PTFE-coated carbon particles by the following process, instead of step S210. The mixed solution obtained at step S205 was subjected to centrifugal separation using a centrifuge, and a precipitate was obtained. The precipitate was dried in a drying furnace set to 150° C., so that the PTFE-coated carbon particles were obtained. The particle diameter of the PTFE-coated carbon particles obtained in the first comparative example was 4 to 7 μm. The other processes (steps S205, S215 to S225 and S110 to S135) were the same as those of the example described above.

B4. Second Comparative Example

MEGA of a second comparative example was produced. The production method of MEGA of the second comparative example mixed acetylene black (HS-100 manufactured by DENKI KAGAKU KOGYO KABUSHIKI KAISHA) with PTFE particles (M-111 manufactured by DAIKIN INDUSTRIES, LTD.) for 30 minutes using a V blender, instead of steps S205 and S210, so as to obtain a mixture of carbon and PTFE. In the mixture, the content of acetylene black was 60 wt %, and the content of the PTFE particles was 40 wt %. The average particle diameter of the PTFE particles was about 30 μm. The other processes (steps S215, S220, S225 and S110 to S135) were the same as those of the example described above.

B5. Third Comparative Example

MEGA of a third comparative example was produced. The mixed solution obtained at step S205 was applied on carbon paper, so that MPL layers were formed on gas diffusion layers. The composition of the mixed solution was controlled to be suitable for application on the carbon paper. More specifically, the dispersed solution of PTFE was added, such that the amount of PTFE (solid substance) in the mixed solution was 20 wt %. An ink for catalyst layer was applied on both surfaces of the electrolyte membrane to form catalyst layers. The MEGA was produced by joining the electrolyte membrane with the catalyst layers formed thereon with the gas diffusion layers with the MPL layers formed thereon.

B6. Evaluation Test

Four different fuel cells were produced using the MEGAs produced in the example, the first comparative example, the second comparative example and the third comparative example described above and were subjected to a power generation test for evaluation of the power generation performance. More specifically, the respective fuel cells were operated under the same conditions, and their voltages at the current density of 1.0 A/cm2 were measured. The power generation performances of these fuel cells were evaluated, based on the measured voltages. The voltages of the respective fuel cells were measured at the fuel cell temperature during operation set to 80° C. and 50° C. The temperature of 80° C. simulates the temperature suitable for power generation, and the temperature of 50° C. simulates the temperature of the fuel cell at the start. Table 1 given below shows the results of the evaluation test.

TABLE 1

|  |  | EX | $1^{ST}$ COMP EX | $2^{nd}$ COMP EX | $3^{rd}$ COMP EX |
|---|---|---|---|---|---|
| FUEL CELL TEMPERATURE | 80° C. | 670 mV | 650 mV | 650 mV | 630 mV |
|  | 50° C. | 580 mV | 550 mV | 500 mV | 320 mV |

As shown in Table 1 above, the fuel cell using the MEGA of the example had the higher measured voltages at both 80° C. and 50° C. than the fuel cells using the MEGAs of the respective comparative examples. This means that the fuel cell using the MEGA of the example has the higher power generation performance than those of the fuel cells using the MEGAs of the respective comparative examples. Especially, the differences between the voltage of the fuel cell using the MEGA of the example and the voltages of the fuel cells using the MEGAs of the respective comparative examples at the relatively low fuel cell temperature (at 50° C.) are greater than those at the relatively high fuel cell temperature (at 80° C.).

The first comparative example produces the PTFE-coated carbon particles from the precipitate obtained by centrifugal separation of the mixed solution. Compared with the PTFE-coated carbon particles obtained by spray drying technique like the example, the produced PTFE-coated carbon particles are likely to have the lower dispersibility of carbon and PTFE. It is thus likely to cause the unevenness in water drainage performance in the MPL layers in the resulting fuel cell and provide the lower power generation performance compared with that of the example.

The average particle diameter (about 30 μm) of the PTFE particles used in the second comparative example is significantly larger than the average particle diameter (about 0.3 μm) of PTFE in the dispersed solution of PTFE of the example. This makes the carbon particles and the PTFE particles unlikely to be homogeneously mixed in the mixing process of the carbon particles and the PTFE particles. Additionally, the second comparative example mixes the two different particles and is thus likely to have difficulty in uniform dispersion of carbon and PTFE, compared with the example. Because of these reasons, it is likely to cause the unevenness in water drainage performance in the MPL layers in the resulting fuel cell and provide the lower power generation performance compared with that of the example.

The third comparative example applies the mixed solution of carbon and PTFE on the carbon paper as the base material of the gas diffusion layer. The mixed solution is thus penetrated in the carbon paper. In the resulting fuel cell, this makes water likely to be accumulated in an area of the gas diffusion layer (carbon paper) which the mixed solution is penetrated in and thereby deteriorates the water drainage performance. In close observation of the area of the carbon paper which the mixed solution is penetrated in, part of an area in which the mixed solution is not penetrated in may be placed between the areas which the mixed solution is penetrated in along the thickness direction of the carbon paper. Water is likely to gather and is unlikely to be drained in this part by, for example, capillarity in the area which the mixed solution is penetrated in. Accordingly water is more likely to be accumulated in this part.

Additionally, in the third comparative example, penetration of the mixed solution in the carbon paper reduces the gas diffusion area and deteriorates the gas dispersibility. As a result, the third comparative example has unevenness in water drainage performance in the MPL layers in the resulting fuel cell or interference with the gas dispersibility. It is thus likely to provide the lower power generation performance compared with that of the example.

At the relatively lower fuel cell temperature of 50° C., water is more likely to be aggregated than at the relatively higher fuel cell temperature of 80° C. Accordingly, the differences in water drainage performance between the example and the respective comparative examples more significantly appear as the differences in power generation efficiency (voltage) at the fuel cell temperature of 50° C.

C. Modifications

C1. Modification 1

In the embodiment and its example described above, the MPL layer of one electrode and the MPL layer of the other electrode are formed at different steps (steps S120 and S130). The invention is, however, not limited to this procedure. A modified procedure may form catalyst layers of both the electrodes prior to formation of the MPL layer of ether electrode and then simultaneously join the MPL sheets with the catalyst layers of both the electrodes to simultaneously form the MPL layers of both the electrodes. In the embodiment and its example described above, the GDL layers of both the electrodes are formed simultaneously. Alternatively, the GDL layers of the respective electrodes may be formed at different timings (i.e., at different steps).

C2. Modification 2

In the embodiment and its example described above, the GDL materials are cut by the two cutting machines 530 and 535 and are then joined with the MPL layers. The invention is, however, not limited to this procedure. For example, one modified procedure may join the GDL materials with the MPL layers and subsequently cut the entire membrane electrode assembly to a specified size.

C3. Modification 3

In the embodiment and its example described above, the assembly including the gas diffusion layers is produced as the MEGA. Alternatively, an assembly comprised of the layers other than the gas diffusion layers may be produced. In this modified procedure, the fuel cell is manufactured by joining the completed MEGA with the GDL materials and placing the resulting assembly between separators.

C4. Modification 4

In the embodiment and its example described above, the catalyst layers of both the electrodes are formed by the method of applying the ink for catalyst layer. A modified procedure may prepare catalyst layer sheets in advance like the MPL sheets and join the catalyst layer sheets with the electrolyte membrane to form the catalyst layers of both the electrodes.

C5. Modification 5

In the embodiment and its example described above, the pressure applied for joining the MPL sheets (first pressure) is smaller than the pressure applied for joining the GDL material (second pressure). The invention is, however, not limited to this configuration. The first pressure may be equal to the second pressure or may be larger than the second pressure.

The invention is not limited to any of the embodiment, the examples and the modifications described herein but may be implemented by a diversity of other configurations without departing from the scope of the invention. For example, the technical features of the embodiment, examples or modifications corresponding to the technical features of the respective aspects described in Summary may be replaced or combined appropriately, in order to solve part or all of the problems described above or in order to achieve part or all of the advantageous effects described above. Any of the technical features may be omitted appropriately unless the technical feature is described as essential herein.

REFERENCE SIGNS LIST 10 electrolyte membrane sheet
11 carrier film
12 electrolyte membrane
13 catalyst layer
14 MPL layer
15 catalyst layer
20 electrolyte membrane sheet
40 electrolyte membrane sheet
50 electrolyte membrane sheet
60 assembly
100 feed roller
105 conveyance roller
110 windup roller
120 die head
130 dryer
205 feed roller
210 feed roller
215 windup roller
300 pressure roller
305 conveyance roller
410 removal roller
415 windup roller
500 feed roller
505 feed roller
510 feed roller
515 feed roller
530 cutting machine
535 cutting machine
545 hot press machine
600 first pressure roller
610 second pressure roller

The invention claimed is:

1. A method of producing a membrane electrode and a gas diffusion layer assembly including forming a porous layer placed between a gas diffusion layer and a catalyst layer in a fuel cell, the method comprising:
   (a) obtaining particles containing carbon and a water-repellent resin by spray drying a mixed solution including the carbon and the water-repellent resin;
   (b) producing a paste including the particles;
   (c) extruding or rolling the paste to obtain the porous layer material in a sheet-like form;
   (d) joining the porous layer material with a material for the catalyst layer by applying a first pressure to each other; and
   (e) joining a material for the gas diffusion layer with the porous layer material joined with the material for the catalyst layer by applying a second pressure to each other, the second pressure being smaller than the first pressure.

2. The method according to claim 1, wherein the water-repellent resin comprises polytetrafluoroethylene.

3. The method according to claim 1, further comprising:
   (f) providing an electrolyte membrane sheet that includes a carrier film and an electrolyte membrane placed on the carrier film;
   (g) placing the material for the catalyst layer on the electrolyte membrane of the electrolyte membrane sheet; and
   (h) removing the carrier film from the electrolyte membrane sheet, wherein the method further comprises
performing the step (d) after the step (g) to form the porous layer of one electrode, subsequently performing the step (h) and then performing the step (d) to form the porous layer of the other electrode.

* * * * *